Dec. 1, 1970     P. W. McCONNAUGHEY     3,544,273
APPARATUS FOR SAMPLING AND ANALYZING BREATH
Filed Nov. 4, 1968     2 Sheets-Sheet 1
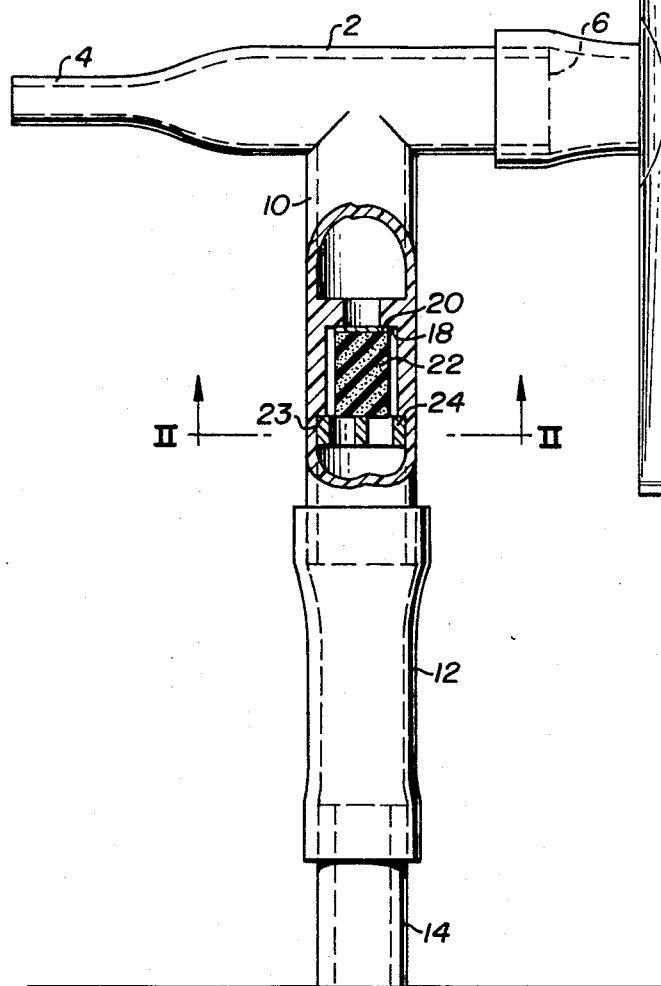
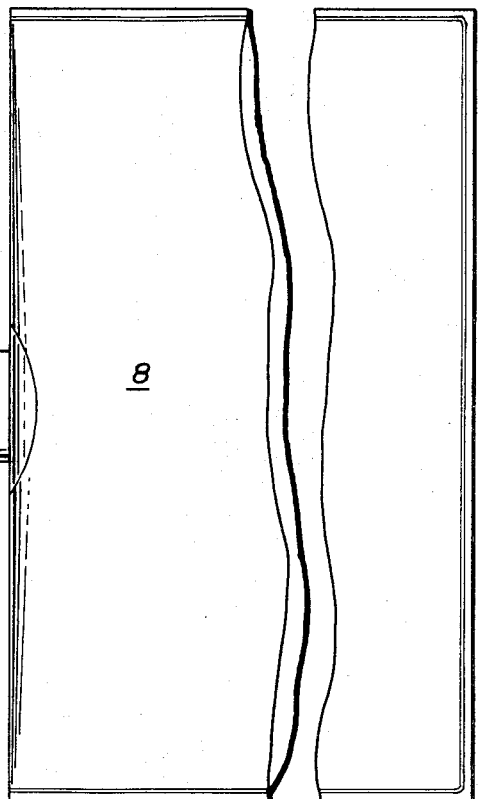
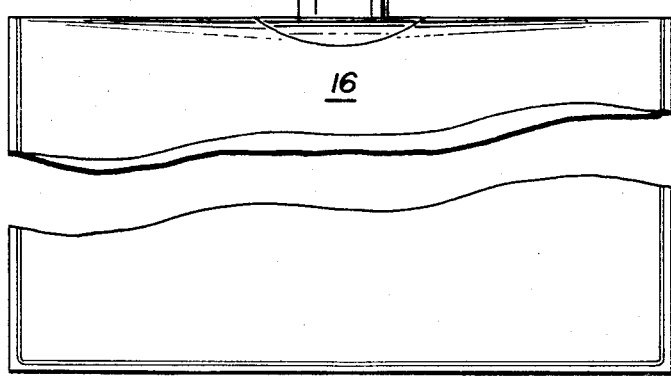
INVENTOR
Paul W. McConnaughey
BY
Ronald H. Shabely

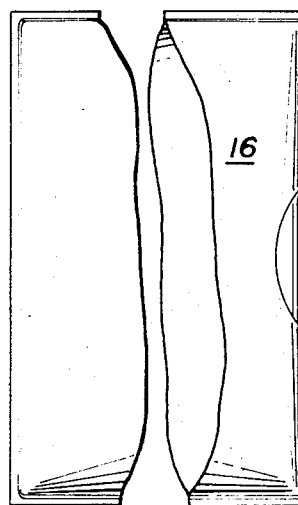
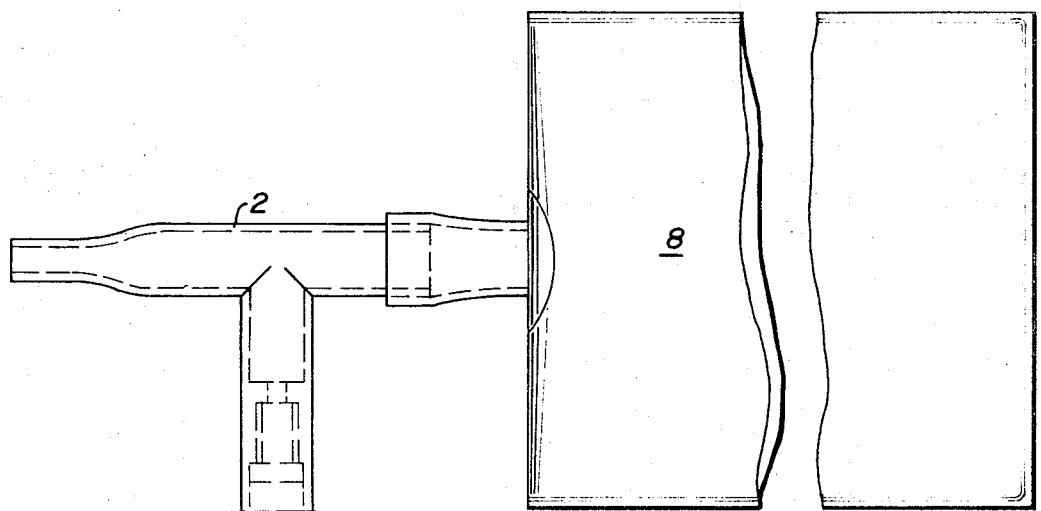
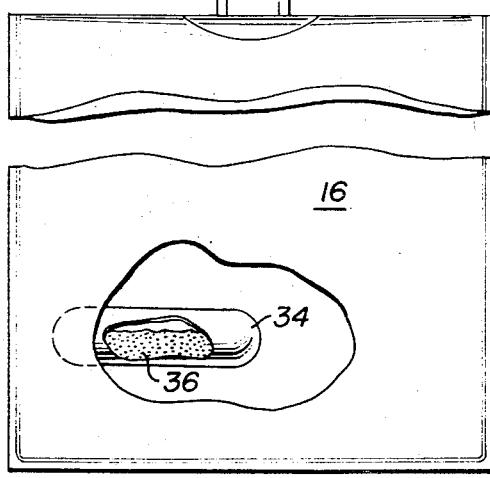

United States Patent Office 3,544,273
Patented Dec. 1, 1970

3,544,273
APPARATUS FOR SAMPLING AND ANALYZING BREATH
Paul W. McConnaughey, Pittsburgh, Pa., assignor to Mine Safety Appliances Company, Pittsburgh, Pa., a corporation of Pennsylvania
Filed Nov. 4, 1968, Ser. No. 773,153
Int. Cl. A61b 5/00; G01n 31/22, 33/16
U.S. Cl. 23—254                                   8 Claims

ABSTRACT OF THE DISCLOSURE

An apparatus for receiving the breath of a subject has an open passage to a first inflatable, non-elastic bag, and a second passage with a one-way valve opening at a predetermined pressure opening into a second inflatable, non-elastic bag. When breathing into the apparatus, the first bag is filled with the first portion of the exhalation and the second bag is filled with alveolar air to be analyzed. The sample is analyzed by contacting it with a colorimetric chemical reagent.

---

This invention relates to apparatus for use in analyzing breath and more particularly to such apparatus that segregates a portion of the expired breath for analysis.

In the use of breath analysis for evaluating physical functions or determining a physiological condition, it is essential to obtain for analysis alveolar air from the subject being tested. The first part of the exhalation, from the mouth, windpipe and large lung passages, must therefore be separated from the latter portion of the exhalation from the alveoli. Law enforcement agencies require apparatus for testing in the field for alcohol in the breath. To be practically useful such apparatus must reliably sample alveolar air and must be simple to operate, both from the point of view of the operator and the subject being tested. Because of the difficulty and expense of sterilizing such apparatus for reuse, it is especially desirable that the entire apparatus be of such low cost that it can be discarded after a single use.

It is an object of this invention to provide a simple, inexpensive apparatus for collecting alveolar air. Another object is to provide such a device having means for analyzing the collected alveolar air. Another object is to provide a device for testing the breath for alcohol content that is small, inexpensive, simple to operate, reliable and accurate for use in the field. Other objects will become apparent from the following description and claims.

In accordance with this invention, a device for receiving the exhaled breath of the subject includes a branched conduit having one branch opening into an inflatable non-elastic bag and a second branch containing a one-way valve that opens at a predetermined exhalation pressure to permit flow of the breath into a second inflatable non-elastic bag. The segregated sample of alveolar collected in the second bag is analyzed by discharging it through a tube containing colorimetric indicator responsive to the gas being tested, or by contacting it with colorimetric indicator in the bag. The seat of the one-way valve is preferably integrally formed with the conduit and the valve head is urged against the seat by a block of resilient foamed plastic or rubber in compression.

In the drawings:

FIG. I is a side elevational view, partly broken away, of an apparatus for collecting alveolar air embodying the present invention;

FIG. II is a sectional view taken along line 2—2 of FIG. I;

FIG. III is a side elevational view of the sample collecting bag of FIG. I with an analytical tube in position for analysis; and FIG. IV is a side elevational view of another embodiment of this invention in which the colorimetric indicator is contained within the collection bag for alveolar air.

Referring now to the drawings, especially FIG. I, the apparatus includes a T-shaped conduit 2, one branch of which is formed into a mouthpiece 4, and one branch of which has an opening 6 into bag 8. The bag 8 is made of a flexible non-elastic material, suitably polyethylene or polyvinyl chloride, and is conveniently secured by adhesive or heat-sealing to conduit 2. The third branch 10 of the conduit opens through flexible tube 12 and conduit 14 into bag 16 which, like bag 8, is formed of flexible non-elastic material. The tube 12 is preferably rubber or other highly resilient material than can be easily pinched closed. The first bag should have a volume of at least about 400 cc., and the volume of the second bag is selected to provide the sample volume needed for the particular analytical device used. Suitably, both bags may have a volume of 800 cc.

Integral shoulder 18 in branch 10 forms an annular valve seat. The valve head 20 is secured to a block 22 of resilient foamed rubber or synthetic resin such as a flexible polyurethane. The valve head is conveniently a gas impervious skin formed integrally on the block 22 by conventional methods, or it may be a separately formed gas impervious seat of rubber, plastic or the like secured by adhesive to block 22. Retaining ring 24 is press-fit in branch 10 against shoulder 23 to compress block 22, biasing the valve closed so that it opens at the desired upstream pressure. In order to insure reliable separation and segregation of alveolar air and permit easy use of the apparatus by the subject, the valve should preferably open at a pressure between about 3 to 15 inches of water, the suitable minimum opening pressure depends to some extent on the geometry of the conduit, especially the size of the passage opening into the first bag. Also, the valve should not be in direct line with the mouthpiece, to prevent premature opening caused by the breath impinging directly on the valve.

In operation, the subject exhales into mouthpiece 4, first fiilling the bag 8; when the bag is full the exhalation pressure acts to open the valve in branch 10, permitting the exhaled breath to fill bag 16. In the event the bag is not filled with one exhalation, the device is removed from the subject's mouth, and bag 8 is collapsed to discharge the air in it out through mouthpiece 4. The subject can then exhale again into the device, repeating the sampling procedure in which the first portion of the exhalation goes into bag 8, and the last, or alveolar, portion goes into bag 16 for analysis.

The flexible tubing 12 is then closed by a clamp or the fingers, the tubing is removed from the conduit 2 and an analytical detector tube 28 is inserted into the flexible tube, as shown in FIG. III. The bag 16 is squeezed to collapse it and expel the alveolar breath sample contained therein through the analytical tube for determining the amount of alcohol in the sample. Alternatively, the bag may be provided with a second outlet for receiving the analytical tube.

The detector tube 29 is a glass tube, with sealed tips that are broken off when the tube is to be used, containing a bed 30 of reagent that changes color in response to contact with the gas to be determined held between glass wool plugs 32. When the air in bag 16 is passed through the tube, a color change occurs lengthwise of the bed, the length of the color-changed portion being dependent on the amount of detectable gas in the sample. When alcohol is being detected, the analytical detector tube can be calibrated directly in percent blood alcohol concentration, inasmuch as the sample volume from the non-elastic bag is predetermined and the alcohol content of alveolar air is proportionate to the alcohol concentration in the blood.

A variety of colorimetric indicators are well known for determination of alcohol. An especially suitable indicator is disclosed in my co-pending application Ser. No. 460,478, filed June 1, 1965, and now U.S. Pat. No. 3,455,654 in which a hexavalent chromium compound and a pentavalent phosphoric acid are supported on an inert carrier. This indicator changes color from yellow to dark green on reaction with ethyl alcohol. A typical illustrative formulation contains 0.53 gram of chromium trioxide and 1.67 grams of metaphosphoric acid carried on 100 milliliters of 8–14 mesh silica gel.

FIG. IV is a modified embodiment of the invention in which the colorimetric indicator 36 is contained in a breakable vial 34 within bag 16. The sample is collected in bag 16 in the same manner as previously described. The vial, containing a predetermined amount of indicator, is then broken while inside the bag to expose the indicator to the air in bag 16. The indicator may be the same as that used in the above-described detector tube; however, when the entire body of indicator is exposed at one time to the air, the presence of varying amounts of alcohol will result in a development of color of varying shades, that are compared to calibrated color standards for determining the amount of alcohol present. Also suitable for use in this embodiment are liquid indicators, such as a solution of sodium dichromate in sulfuric acid, which are easily contained in the ampoule and can be calibrated against color standards. Since the bag 16 does not have to be removed, it is secured directly on the conduit 2. The modification of FIG. IV is especially useful in cold weather since the accuracy of the analysis will not be affected by condensation that may quickly occur in the bag 16 if it is in a cold environment.

The apparatus of this invention is quite simple and sufficiently inexpensive so that it can be discarded after a single use. The conduit 2 is preferably molded of plastic, including the shoulders for the valve elements. The preferred described valve is reliable and of extremely low cost. Of course, the entire apparatus except the chemical indicator, can be reused if properly washed and sterilized; however, under present economic conditions the cost of such preparation for reuse is greater than the cost of the device.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:
1. An apparatus for sampling alveolar breath comprising a first conduit having a first open end and a second open end, a second conduit opening to said first conduit intermediate of said open ends and having a third open end, a one-way valve in said second conduit loaded to open at a predetermined pressure to permit flow out of said third open end, a non-elastic inflatable bag having an opening in communication with said second open end and a second non-elastic inflatable bag having an opening in communication with said third open end.

2. An apparatus according to claim 1 in which the predetermined pressure is between about 3 and 15 inches of water.

3. An apparatus according to claim 1 in which said second bag is inter-connected with said third open end by a resilient tube.

4. An apparatus according to claim 1 in which said valve comprises an annular seat integral with said second conduit, a gas impervious valve head adapted to engage said seat, a retainer means in said conduit spaced from said seat and a resilient block of smaller cross-section than said conduit compressed between said retainer means and said valve head, thereby urging said head against said seat.

5. An apparatus according to claim 1, having a breakable ampoule within said second bag and containing a predetermined amount of colorimetric indicator responsive to ethyl alcohol.

6. An apparatus according to claim 1 wherein said first and second conduits comprise a unitary T-shaped conduit, wherein said second conduit has an integral annular valve seat and a shoulder spaced lengthwise from said seat, a block of resilient material having a non-permeable surface engaging said valve seat, the normal length of said block exceeding the distance between said seat and shoulder, a retainer ring press-fit in said branch and abutting said shoulder, thereby compressing said block.

7. An apparatus according to claim 6 in which the predetermined pressure is between about 3 and 15 inches of water.

8. An apparatus according to claim 7 in which said second bag is inter-connected with said third open end by a resilient tube.

References Cited
UNITED STATES PATENTS

| | | | |
|---|---|---|---|
| 3,196,689 | 7/1965 | Forrester et al. | 23—232UX |
| 3,437,449 | 4/1969 | Luckey | 23—254 |

MORRIS O. WOLK, Primary Examiner

R. M. REESE, Assistant Examiner

U.S. Cl. X.R.

23—232; 73—421.5; 128—2, 2.07

Disclaimer 3,544,273.—*Paul W. McConnaughey*, Pittsburgh, Pa. APPARATUS FOR SAMPLING AND ANALYZING BREATH. Patent dated Dec. 1, 1970. Disclaimer filed Aug. 23, 1972, by the assignee, *Mine Safety Appliances Company*.

Hereby enters this disclaimer to claims 1, 2, 3, 4, 7 and 8 of said patent.
[*Official Gazette January 16, 1973.*]